(12) United States Patent
Magill et al.

(10) Patent No.: US 7,836,722 B2
(45) Date of Patent: Nov. 23, 2010

(54) CONTAINERS AND PACKAGINGS FOR REGULATING HEAT TRANSFER

(75) Inventors: Monte C. Magill, Longmont, CO (US); Jeanette Heimbach, Boulder, CO (US)

(73) Assignee: Outlast Technologies, Inc., Boulder, CO (US)

( * ) Notice: Subject to any disclaimer, the term of this patent is extended or adjusted under 35 U.S.C. 154(b) by 959 days.

(21) Appl. No.: 11/471,166

(22) Filed: Jun. 19, 2006

(65) Prior Publication Data

US 2007/0000484 A1 Jan. 4, 2007

Related U.S. Application Data

(60) Provisional application No. 60/692,735, filed on Jun. 21, 2005.

(51) Int. Cl.
*F25D 3/08* (2006.01)

(52) U.S. Cl. ............... 62/457.3; 62/457.1; 62/457.2; 62/457.7; 62/530

(58) Field of Classification Search ............ 62/457.1, 62/457.2, 457.3, 457.7, 530, 457.4
See application file for complete search history.

(56) References Cited

U.S. PATENT DOCUMENTS

| | | | | |
|---|---|---|---|---|
| 4,183,226 A | * | 1/1980 | Moore | ............... 62/457.4 |
| 4,505,953 A | | 3/1985 | Chen | |
| 4,708,812 A | | 11/1987 | Hatfield | |
| 5,163,504 A | | 11/1992 | Resnick | |
| 5,201,194 A | * | 4/1993 | Flynn et al. | ............... 62/457.3 |
| 5,433,953 A | | 7/1995 | Tsuei et al. | |
| 5,589,194 A | | 12/1996 | Tsuei et al. | |
| 5,637,389 A | | 6/1997 | Colvin et al. | |
| 5,647,226 A | * | 7/1997 | Scaringe et al. | ............ 62/457.2 |
| 5,792,472 A | | 8/1998 | Roux et al. | |
| 5,804,297 A | | 9/1998 | Colvin et al. | |

(Continued)

FOREIGN PATENT DOCUMENTS

| WO | WO9402257 A2 | 2/1994 |
|---|---|---|
| WO | WO9724968 A1 | 7/1997 |

OTHER PUBLICATIONS

Cho, Jeong-Sook, Kwon, Aehwa and Cho, Chang-Gi "Microencapsulation of Octadecane as a Phase-Change Material by Interfacial Polymerization in an Emulsion System" Colloid Polym Sci 280: pp. 260-266 © 2002.*

International Search Report and Written Opinion dated Feb. 21, 2007 in PCT application No. PCT/US06/24158.

*Primary Examiner*—Frantz F Jules
*Assistant Examiner*—Daniel C Comings
(74) *Attorney, Agent, or Firm*—Neugeboren O'Dowd PC

(57) ABSTRACT

A food container includes an upper wall, a lower wall, and a side wall extending between the upper wall and the lower wall. At least one of the upper wall, the lower wall, and the side wall includes a plurality of microcapsules containing a phase change material. The phase change material has a latent heat in the range of 40 J/g to 400 J/g and a transition temperature in the range of 0° C. to 100° C. The phase change material provides thermal regulation based on at least one of absorption and release of the latent heat at the transition temperature.

14 Claims, 8 Drawing Sheets

U.S. PATENT DOCUMENTS

| | | |
|---|---|---|
| 6,321,927 B2 | 11/2001 | Cavella |
| 6,634,417 B1 | 10/2003 | Kolowich |
| 6,889,861 B2 | 5/2005 | Arcati et al. |
| 6,968,888 B2 | 11/2005 | Kolowich |
| 2002/0016505 A1 | 2/2002 | Gally et al. |
| 2004/0033743 A1* | 2/2004 | Worley et al. ............. 442/59 |

* cited by examiner

CONTAINERS AND PACKAGINGS FOR REGULATING HEAT TRANSFER

CROSS-REFERENCE TO RELATED APPLICATION

This application claims the benefit of U.S. Provisional Application Ser. No. 60/692,735, filed on Jun. 21, 2005, the disclosure of which is incorporated herein by reference in its entirety.

FIELD OF THE INVENTION

The invention generally relates to containers and packagings. For example, food containers and food container holders for regulating heat transfer are described.

BACKGROUND OF THE INVENTION

A variety of food containers are currently used for containing solid food items and non-solid food items. For example, a beverage bottle is often used for containing a beverage such as a soft drink. Such a beverage bottle is typically kept in a refrigerator or a cooler prior to consumption, since a consumer will typically prefer to drink a soft drink if it is cold. During consumption, the consumer can drink the soft drink from the beverage bottle itself or can transfer the soft drink to another beverage container such as a cup. In either circumstance, after the soft drink is removed from the refrigerator or the cooler, the soft drink has an undesirable tendency to warm up. As another example, a consumer will typically prefer to drink coffee if it is hot or warm. Coffee is typically prepared in a beverage container such as a coffee pot. During consumption, a consumer can transfer the coffee to another beverage container such as a cup, in which the coffee has an undesirable tendency to cool down.

Heat transfer can occur between an outside environment and contents of a food container via different modes. One mode of heat transfer can involve conduction of heat. In particular, if an object at a higher or lower temperature comes in contact with the food container, heat can be conducted between the object and the food container. Thus, for example, as a consumer holds a beverage bottle during consumption, heat can be conducted from the consumer's hand to the beverage bottle, thus undesirably warming a soft drink that is contained within the beverage bottle. Other modes of heat transfer can also play a role in warming or cooling contents of a food container. For example, convection of heat from air surrounding a beverage bottle as well as radiation of heat from sunlight or another light source can further accelerate warming of a soft drink that is contained within the beverage bottle.

It is against this background that a need arose to develop the containers and packagings described herein.

SUMMARY OF THE INVENTION

In one aspect, the invention relates to a food container. In one embodiment, the food container includes an upper wall, a lower wall, and a side wall extending between the upper wall and the lower wall. At least one of the upper wall, the lower wall, and the side wall includes a set of microcapsules containing a phase change material. The phase change material has a latent heat in the range of 40 J/g to 400 J/g and a transition temperature in the range of 0° C. to 100° C. The phase change material provides thermal regulation based on at least one of absorption and release of the latent heat at the transition temperature.

In another embodiment, the food container includes a body portion defining a compartment to contain a food item. The body portion includes a first layer and a second layer adjacent to the first layer and including a binder and a set of microcapsules dispersed in the binder. The set of microcapsules contain a phase change material having a latent heat of at least 40 J/g and a transition temperature in the range of 0° C. to 100° C.

In another aspect, the invention relates to a food container holder. In one embodiment, the food container holder includes a body portion defining a compartment to receive a food container. The body portion includes a phase change material having a latent heat of at least 40 J/g and a transition temperature in the range of 0° C. to 100° C. The phase change material provides thermal regulation based on at least one of absorption and release of the latent heat at the transition temperature.

Other aspects and embodiments of the invention are also contemplated. For example, other aspects of the invention relate to a method of forming a food container, a method of forming a food container holder, a method of providing thermal regulation using a food container, and a method of providing thermal regulation using a food container holder. The foregoing summary and the following detailed description are not meant to restrict the invention to any particular embodiment but are merely meant to describe some embodiments of the invention.

BRIEF DESCRIPTION OF THE DRAWINGS

For a better understanding of the nature and objects of some embodiments of the invention, reference should be made to the following detailed description taken in conjunction with the accompanying drawings.

DETAILED DESCRIPTION

Overview

Figure 1:
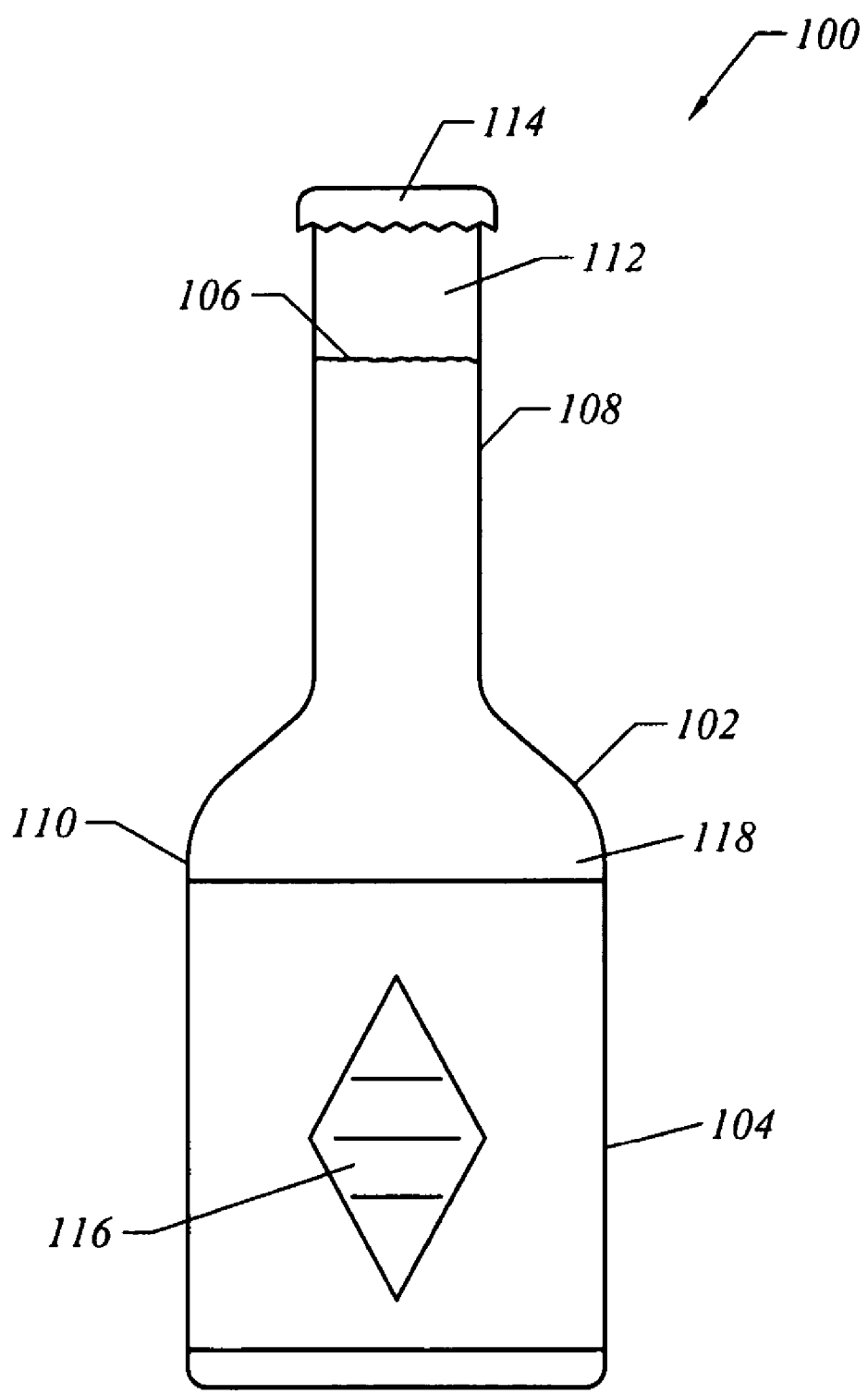
FIG. 1 illustrates a food container that is implemented in accordance with an embodiment of the invention.

Embodiments of the invention relate to containers and packagings. Containers and packagings in accordance with various embodiments of the invention can provide thermal regulation by adjusting or controlling heat transfer between an outside environment and contents of the containers and packagings. In particular, the containers and packagings can include phase change materials, so that the containers and packagings have the ability to absorb or release heat to regulate heat transfer. In such manner, the contents of the containers and packagings can be maintained at a desired temperature or within a desired range of temperatures for a prolonged period of time. Examples of the containers and packagings include food containers, food container holders, labels, large-scale containers for transportation of a variety of products, medical organ packages, packing foams or peanuts, shrink wraps, tapes, and wrapping papers.

Definitions

The following definitions apply to some of the elements described with respect to some embodiments of the invention. These definitions may likewise be expanded upon herein.

As used herein, the singular terms "a," "an," and "the" include plural referents unless the context clearly dictates otherwise. Thus, for example, reference to a phase change material can include multiple phase change materials unless the context clearly dictates otherwise.

As used herein, the term "set" refers to a collection of one or more elements. Thus, for example, a set of microcapsules can include a single microcapsule or multiple microcapsules. Elements of a set can also be referred to as members of the set. Elements of a set can be the same or different. In some instances, elements of a set can share one or more common characteristics:

As used herein, the term "adjacent" refers to being near or adjoining. Objects that are adjacent can be spaced apart from one another or can be in actual or direct contact with one another. In some instances, objects that are adjacent can be coupled to one another or can be formed integrally with one another.

As used herein, the terms "integral" and "integrally" refer to a non-discrete portion of an object. Thus, for example, a beverage bottle including a neck portion and a body portion that is formed integrally with the neck portion can refer to an implementation of the beverage bottle in which the neck portion and the body portion are formed as a monolithic unit. An integrally formed portion of an object can differ from one that is coupled to the object, since the integrally formed portion of the object typically does not form an interface with a remaining portion of the object.

As used herein, the term "size" refers to a largest dimension of an object. Thus, for example, a size of a spheroid can refer to a major axis of the spheroid. As another example, a size of a sphere can refer to a diameter of the sphere.

As used herein, the term "monodisperse" refers to being substantially uniform with respect to a set of characteristics. Thus, for example, a set of microcapsules that are monodisperse can refer to such microcapsules that have a narrow distribution of sizes around a mode of the distribution of sizes, such as a mean of the distribution of sizes. In some instances, a set of microcapsules that are monodisperse can have sizes exhibiting a standard deviation of less than 20 percent with respect to a mean of the sizes, such as less than 10 percent or less than 5 percent.

As used herein, the term "latent heat" refers to an amount of heat absorbed or released by a substance (or a mixture of substances) as it undergoes a transition between two states. Thus, for example, a latent heat can refer to an amount of heat that is absorbed or released as a substance (or a mixture of substances) undergoes a transition between a liquid state and a solid state, a liquid state and a gaseous state, a solid state and a gaseous state, or two solid states.

As used herein, the term "transition temperature" refers to a temperature at which a substance (or a mixture of substances) undergoes a transition between two states. Thus, for example, a transition temperature can refer to a temperature at which a substance (or a mixture of substances) undergoes a transition between a liquid state and a solid state, a liquid state and a gaseous state, a solid state and a gaseous state, or two solid states.

As used herein, the term "phase change material" refers to a substance (or a mixture of substances) that has the capability of absorbing or releasing heat to regulate heat transfer at or within a temperature stabilizing range. A temperature stabilizing range can include a specific transition temperature or a range of transition temperatures. In some instances, a phase change material can be capable of inhibiting heat transfer during a period of time when the phase change material is absorbing or releasing heat, typically as the phase change material undergoes a transition between two states. This action is typically transient and will occur until a latent heat of the phase change material is absorbed or released during a heating or cooling process. Heat can be stored or removed from a phase change material, and the phase change material typically can be effectively recharged by a source of heat or cold. For certain implementations, a phase change material can be a mixture of two or more substances. By selecting two or more different substances and forming a mixture, a temperature stabilizing range can be adjusted for any desired application. The resulting mixture can exhibit two or more different transition temperatures or a single modified transition temperature when incorporated in a container or a packaging described herein.

As used herein, the term "polymer" refers to a substance (or a mixture of substances) that includes a set of macromolecules. Macromolecules included in a polymer can be the same or can differ from one another in some fashion. A macromolecule can have any of a variety of skeletal structures, and can include one or more types of monomer units. In particular, a macromolecule can have a skeletal structure that is linear or non-linear. Examples of non-linear skeletal structures include branched skeletal structures, such those that are star branched, comb branched, or dendritic branched, and network skeletal structures. A macromolecule included in a homopolymer typically includes one type of monomer unit, while a macromolecule included in a copolymer typically includes two or more types of monomer units. Examples of copolymers include statistical copolymers, random copolymers, alternating copolymers, periodic copolymers, block copolymers, radial copolymers, and graft copolymers. In some instances, a reactivity and a functionality of a polymer can be altered by addition of a functional group such as an amine, an amide, a carboxyl, a hydroxyl, an ester, an ether, an epoxide, an anhydride, an isocyanate, a silane, a ketone, an aldehyde, or an unsaturated group. Also, a polymer can be capable of cross-linking, entanglement, or hydrogen bonding in order to increase its mechanical strength or its resistance to degradation under ambient or processing conditions. As can be appreciated, a polymer can be provided in a variety of forms having different molecular weights, since a molecular weight of the polymer can be dependent upon processing conditions used for forming the polymer. Accordingly, a polymer can be referred to as having a specific molecular weight or a range of molecular weights. As used herein with reference to a polymer, the term "molecular weight" can refer to a number average molecular weight, a weight average molecular weight, or a melt index of the polymer.

Examples of polymers include polyhydroxyalkonates, polyamides, polyamines, polyimides, polyacrylics (e.g., polyacrylamide, polyacrylonitrile, and esters of methacrylic acid and acrylic acid), polycarbonates (e.g., polybisphenol A carbonate and polypropylene carbonate), polydienes (e.g., polybutadiene, polyisoprene, and polynorbornene), polyepoxides, polyesters (e.g., polycaprolactone, polyethylene adipate, polybutylene adipate, polypropylene succinate, polyesters based on terephthalic acid, and polyesters based on phthalic acid), polyethers (e.g., polyethylene glycol or polyethylene oxide, polybutylene glycol, polypropylene oxide, polyoxymethylene or paraformaldehyde, polytetramethylene ether or polytetrahydrofuran, and polyepichlorohydrin), polyfluorocarbons, formaldehyde polymers (e.g., urea-formaldehyde, melamine-formaldehyde, and phenol formaldehyde), natural polymers (e.g., polysaccharides, such as cellulose, chitan, chitosan, and starch; lignins; and waxes), polyolefins (e.g., polyethylene, polypropylene, polybutylene, polybutene, and polyoctene), polyphenylenes, silicon containing polymers (e.g., polydimethyl siloxane and polycarbomethyl silane), polyurethanes, polyvinyls (e.g., polyvinyl butyral, polyvinyl alcohol, esters and ethers of polyvinyl alcohol, polyvinyl acetate, polystyrene, polymethylstyrene, polyvinyl chloride, polyvinyl pyrrolidone, polymethyl vinyl ether, polyethyl vinyl ether, and polyvinyl methyl ketone), polyacetals, polyarylates, alkyd based polymers (e.g., polymers based on glyceride oil), copolymers (e.g., polyethylene-co-vinyl acetate and polyethylene-co-acrylic acid), and mixtures thereof.

As used herein, the term "food" refers to a substance (or a mixture of substances) that can be consumed by a living organism. In some instances, a food item can be metabolized by a living organism, and can serve as a source of energy, nourishment, or nutrients. Examples of food items include solid food items, non-solid food items, such as beverages, and mixtures thereof.

Food Containers

Attention first turns to FIG. 1, which illustrates a side view of a food container 100 that is implemented in accordance with an embodiment of the invention. The food container 100 is implemented as a beverage container, and includes a beverage bottle 102 and a label 104 that is adjacent to the beverage bottle 102.

In the illustrated embodiment, the beverage bottle 102 is implemented to receive and to contain a beverage 106, which can be, for example, a soft drink. Advantageously, the beverage bottle 102 is implemented to provide thermal regulation by adjusting heat transfer between an outside environment and the beverage 106 that is contained within the beverage bottle 102. In particular, after the beverage bottle 102 is removed from a refrigerator or a cooler, the beverage 106 has an undesirable tendency to warm up via one or more modes of heat transfer, and the beverage bottle 102 is implemented to counteract this undesirable tendency.

Referring to FIG. 1, the beverage bottle 102 includes a neck portion 108 and a body portion 110 that is formed integrally with the neck portion 108. The neck portion 108 and the body portion 110 define an internal compartment 112 within which the beverage 106 is positioned. As illustrated in FIG. 1, at least one of the neck portion 108 and the body portion 110 is formed of a translucent or transparent material, such as a glass or a polymer, so that a consumer can view the beverage 106 that is contained within the beverage bottle 102. In the illustrated embodiment, at least one of the neck portion 108 and the body portion 110 is also formed of a phase change material, which serves to absorb or release heat to regulate heat transfer across the beverage bottle 102. Thus, for example, as a consumer holds the beverage bottle 102 during use, the phase change material can absorb heat that would otherwise be conducted from the consumer's hand to the beverage 106. In such manner, the beverage 106 can be maintained at a relatively low temperature or a relatively low range of temperatures for a prolonged period of time. Advantageously, the use of the phase change material allows the beverage bottle 102 to provide thermal regulation on an "as-needed" basis. In particular, since the consumer can intermittently hold the beverage bottle 102, the phase change material can absorb heat primarily during those periods of time when the consumer is actually holding the beverage bottle 102. It is contemplated that the phase change material can release heat back to the outside environment during those periods of time when the consumer is not actually holding the beverage bottle 102. The selection of materials forming the beverage bottle 102 can be dependent upon other considerations, such as to prolong a shelf-life of the beverage 106.

In the illustrated embodiment, the beverage bottle 102 also includes a cap 114, which is formed of any suitable material, such as a metal or a polymer. The cap 114 is coupled to an end of the neck portion 108 using any suitable fastening mechanism, thus sealing the beverage 106 within the beverage bottle 102 prior to consumption.

As illustrated in FIG. 1, the label 104 is implemented as a display element to convey information related to the beverage bottle 102. In particular, the label 104 includes indicia 116 to convey information related to the beverage 106 or related to a manufacturer or another source of the beverage bottle 102. In the illustrated embodiment, the label 104 is coupled to an outer surface 118 of the beverage bottle 102 using any suitable fastening mechanism, such as a pressure-sensitive adhesive. The label 104 is formed of any suitable material, such as a fibrous material, a metal, or a polymer.

The use of specific materials and other specific implementation features can further enhance thermal regulating characteristics of the beverage bottle 102. For example, as further described below, a latent heat, a transition temperature, a loading level, and a distribution of the phase change material can contribute to the thermal regulating characteristics of the beverage bottle 102. In particular, it is contemplated that the phase change material can be distributed so as to provide sufficient coverage of those portions of the beverage bottle 102 that are typically in contact with the beverage 106 or with a consumer's hand during use. As another example, the label 104 can be formed so as to include the same or a different phase change material, which serves to absorb or release heat to regulate heat transfer across the label 104. In this example, dimensions of the label 104 can be selected so as to provide sufficient coverage of the outer surface 118 of the beverage bottle 102. Referring to FIG. 1, a longitudinal dimension of the label 104 can be selected so that the label 104 substantially encircles an outer circumference of the body portion 110. As can be appreciated, such implementation of the label 104 can be referred to as a "360° wrap." In such manner, the label 104 can provide sufficient coverage of those portions of the outer surface 118 that are typically in contact with the beverage 106 or with a consumer's hand during use. It is also contemplated that a transverse dimension of the label 104 can be extended so as to at least partly cover the neck portion 108. It is further contemplated that a separate label (not illustrated in FIG. 1) can be included so as to cover the neck portion 108. Such a separate label can be implemented in a similar fashion as the label 104. As a further example, an adhesive, such as one used to couple the label 104 to the beverage bottle 102, can be formed so as to include the same or a different phase change material.

Figure 2:
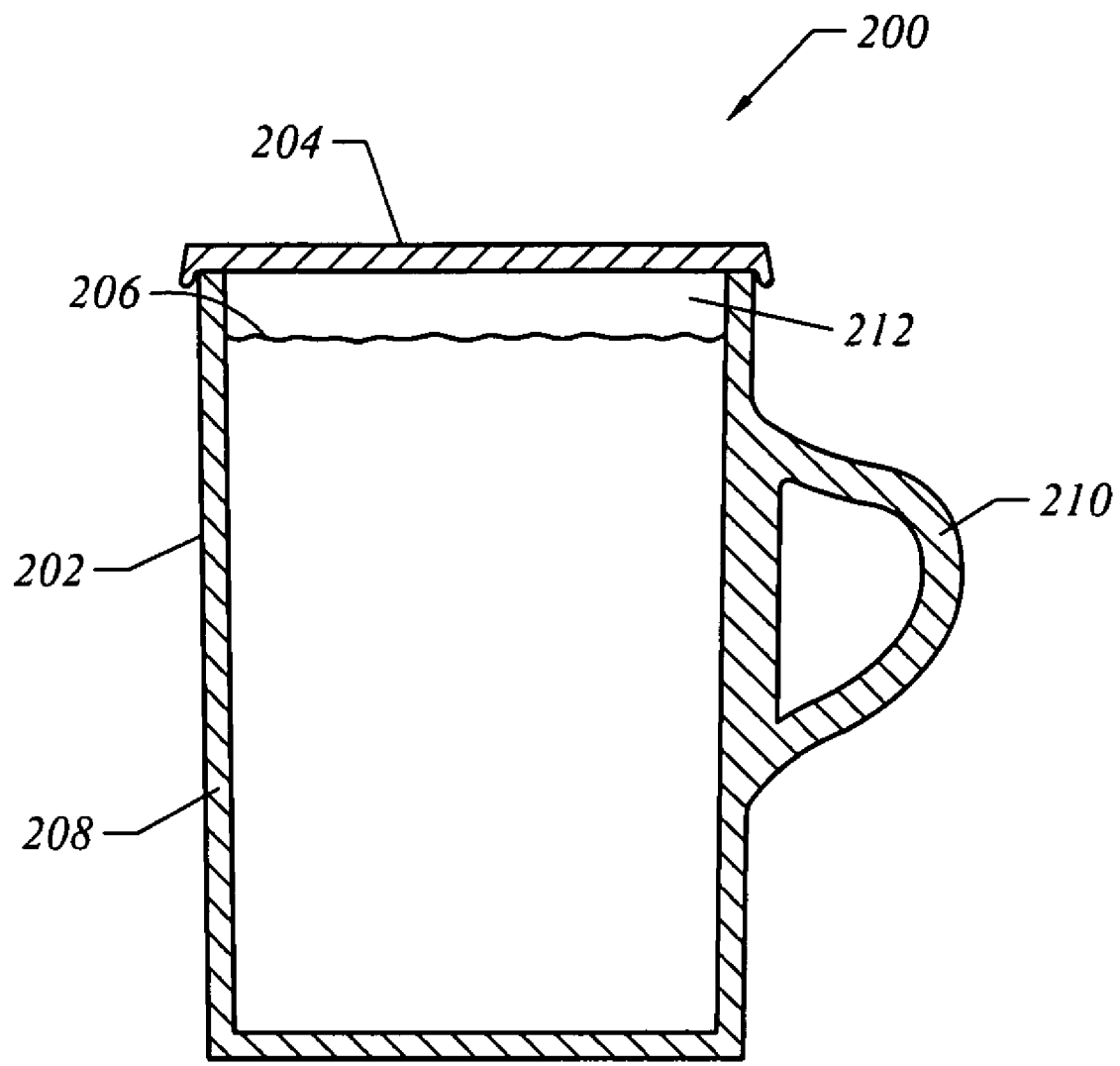
FIG. 2 illustrates a food container that is implemented in accordance with another embodiment of the invention.

Attention next turns to FIG. 2, which illustrates a side, cross-sectional view of a food container 200 that is implemented in accordance with another embodiment of the invention. The food container 200 is implemented as a beverage container, and includes a cup 202 and a cover 204 that is adjacent to the cup 202.

In the illustrated embodiment, the cup 202 is implemented to receive and to contain a beverage 206, which can be, for example, coffee or tea. Advantageously, the cup 202 is implemented to provide thermal regulation by adjusting heat transfer between an outside environment and the beverage 206 that is contained within the cup 202. In particular, after the beverage 206 is transferred to the cup 202 from a coffee pot or a tea pot, the beverage 206 has an undesirable tendency to cool down via one or more modes of heat transfer, and the cup 202 is implemented to counteract this undesirable tendency.

Referring to FIG. 2, the cup 202 includes a body portion 208 and a handle portion 210 that is formed integrally with the body portion 208. The body portion 208 defines an internal compartment 212 within which the beverage 206 is positioned. As illustrated in FIG. 2, the body portion 208 and the handle portion 210 are formed of any suitable materials, such as ceramics, fibrous materials, glasses, metals, or polymers. The body portion 208 and the handle portion 210 can be formed of the same material or different materials. In the illustrated embodiment, at least one of the body portion 208 and the handle portion 210 is also formed of a phase change material, which serves to absorb or release heat to regulate heat transfer across the cup 202. Thus, for example, as a consumer holds the cup 202 during use, the phase change material can absorb heat that would otherwise be conducted from the beverage 206 to the consumer's hand. As the beverage 206 begins to cool down, the phase change material can release the heat back to the beverage 206. In such manner, the beverage 206 can be maintained at a relatively high temperature or a relatively high range of temperatures for a prolonged period of time. Advantageously, the use of the phase change material allows the cup 202 to provide thermal regulation on an "as-needed" basis, dependent upon a temperature of the beverage 206 and a temperature of an outside environment. The selection of materials forming the cup 202 can be dependent upon other considerations, such as whether the cup 202 is implemented for disposable use or for longer-term use.

As illustrated in FIG. 2, the cover 204 is formed of any suitable material, such as a ceramic, a fibrous material, a glass, a metal, or a polymer. The cover 204 is coupled to an end of the body portion 208 using any suitable fastening mechanism, thus sealing the beverage 206 within the internal compartment 212 prior to consumption. While not illustrated in FIG. 2, it is contemplated that the cover 204 can define an opening through which a consumer can drink the beverage 206 without removing the cover 204.

The use of specific materials and other specific implementation features can further enhance thermal regulating characteristics of the cup 202. For example, as further described below, a latent heat, a transition temperature, a loading level, and a distribution of the phase change material can contribute to the thermal regulating characteristics of the cup 202. In particular, it is contemplated that the phase change material can be distributed so as to provide sufficient coverage of those portions of the cup 202 that are typically in contact with the beverage 206 or with a consumer's hand during use. As another example, the cover 204 can be formed so as to include the same or a different phase change material, which serves to absorb or release heat to regulate heat transfer across the cover 204.

Figure 3:
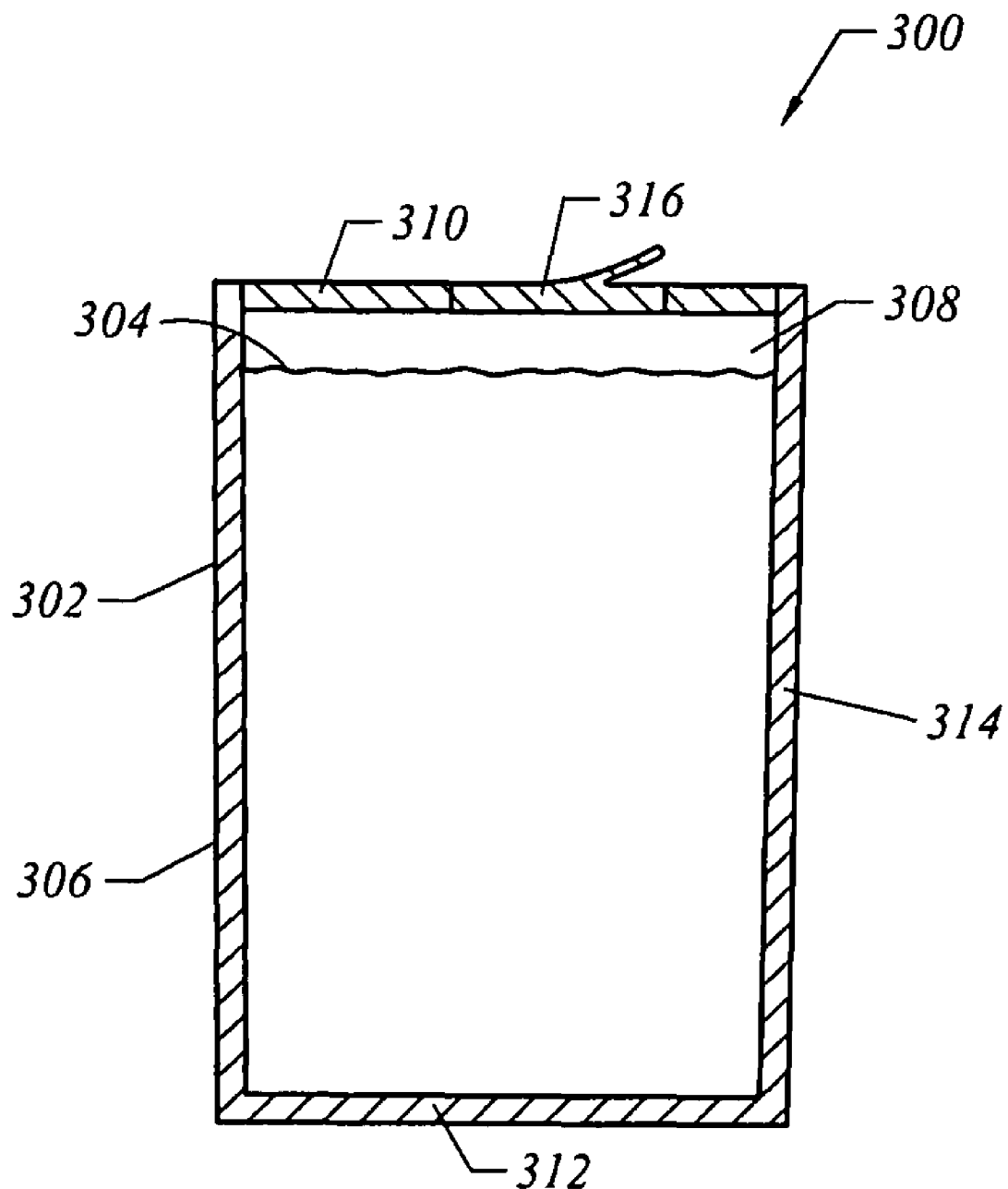
FIG. 3 illustrates a food container that is implemented in accordance with yet another embodiment of the invention.

Attention next turns to FIG. 3, which illustrates a side, cross-sectional view of a food container 300 that is implemented in accordance with yet another embodiment of the invention. In the illustrated embodiment, the food container 300 includes a beverage can 302 that is implemented to receive and to contain a beverage 304, which can be, for example, beer. Advantageously, the beverage can 302 is implemented to provide thermal regulation by adjusting heat transfer between an outside environment and the beverage 304 that is contained within the beverage can 302. In particular, after the beverage can 302 is removed from a refrigerator or a cooler, the beverage 304 has an undesirable tendency to warm up via one or more modes of heat transfer, and the beverage can 302 is implemented to counteract this undesirable tendency.

Referring to FIG. 3, the beverage can 302 includes a body portion 306, which defines an internal compartment 308 within which the beverage 304 is positioned. The body portion 306 includes an upper wall 310, a lower wall 312, and a substantially cylindrical side wall 314 extending between the upper wall 310 and the lower wall 312. As illustrated in FIG. 3, the upper wall 310 includes a tab member 316, such as a pull tab, which is operable to define an opening to provide access to the beverage 304 during consumption. In the illustrated embodiment, the lower wall 312 is formed integrally with one end of the side wall 314, while the upper wall 310 is coupled to another end of the side wall 314 using any suitable fastening mechanism, thus sealing the beverage 304 within the beverage can 302 prior to consumption.

As illustrated in FIG. 3, the upper wall 310, the lower wall 312, and the side wall 314 are formed of any suitable materials, such as metals. The upper wall 310, the lower wall 312, and the side wall 314 can be formed of the same material or different materials. In the illustrated embodiment, at least one of the upper wall 310, the lower wall 312, and the side wall 314 is also formed of a phase change material, which serves to absorb or release heat to regulate heat transfer across the beverage can 302. Thus, for example, as a consumer holds the beverage can 302 during use, the phase change material can absorb heat that would otherwise be conducted from the consumer's hand to the beverage 304. In such manner, the beverage 304 can be maintained at a relatively low temperature or a relatively low range of temperatures for a prolonged period of time. Advantageously, the use of the phase change material allows the beverage can 302 to provide thermal regulation on an "as-needed" basis, dependent upon a temperature of the beverage 304 and a temperature of an outside environment. The selection of materials forming the beverage can 302 can be dependent upon other considerations, such as to prolong a shelf-life of the beverage 304.

The use of specific materials and other specific implementation features can further enhance thermal regulating characteristics of the beverage can 302. For example, as further described below, a latent heat, a transition temperature, a loading level, and a distribution of the phase change material can contribute to the thermal regulating characteristics of the beverage can 302. In particular, it is contemplated that the phase change material can be distributed so as to provide sufficient coverage of those portions of the beverage can 302 that are typically in contact with the beverage 304 or with a consumer's hand during use. As another example, a label (not illustrated in FIG. 3) can be included so as to cover the beverage can 302. Such a label can be formed so as to include the same or a different phase change material, which serves to absorb or release heat to regulate heat transfer across the label.

Figure 4:
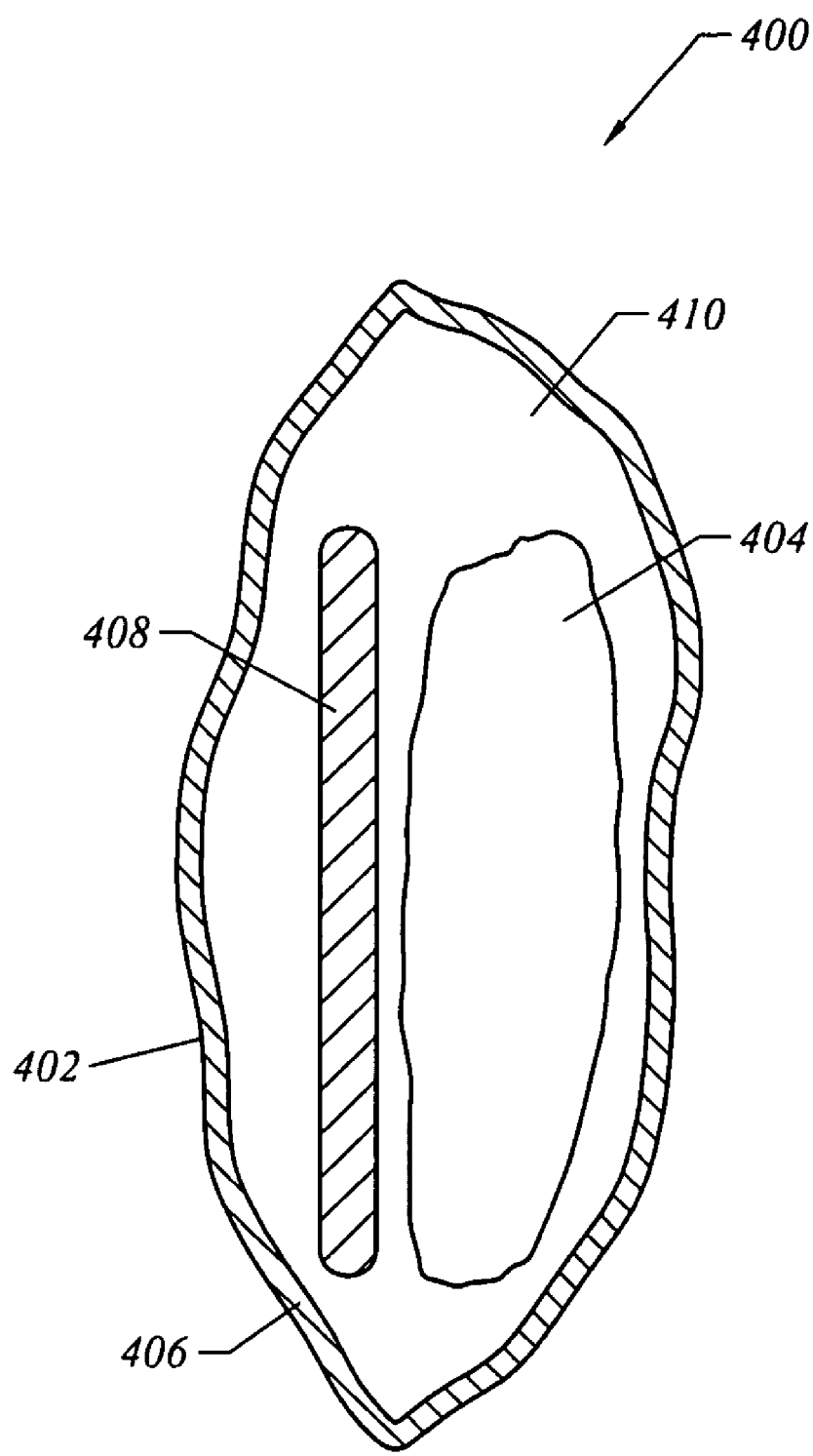
FIG. 4 illustrates a food container that is implemented in accordance with a further embodiment of the invention.

Attention next turns to FIG. 4, which illustrates a side, cross-sectional view of a food container 400 that is implemented in accordance with a further embodiment of the invention. In the illustrated embodiment, the food container 400 includes a bag 402 that is implemented to receive and to contain a perishable food item 404, which can be, for example, a vegetable or a meat product. Advantageously, the bag 402 is implemented to provide thermal regulation by adjusting heat transfer between an outside environment and the food item 404 that is contained within the bag 402. In particular, after the food item 404 is transferred to the bag 402, the food item 404 has an undesirable tendency to warm up via one or more modes of heat transfer, and the bag 402 is implemented to counteract this undesirable tendency.

Referring to FIG. 4, the bag 402 includes a body portion 406 and an insert 408. The body portion 406 defines an internal compartment 410 within which the food item 404 and the insert 408 are positioned. While not illustrated in FIG. 4, it is contemplated that the body portion 406 can include a re-sealable member, which is operable to define an opening to provide access to the food item 404 during consumption. As illustrated in FIG. 4, the body portion 406 and the insert 408 are formed of any suitable flexible materials, such as fibrous materials or polymers. The body portion 406 and the insert 408 can be formed of the same material or different materials. In the illustrated embodiment, at least one of the body portion 406 and the insert 408 is also formed of a phase change material, which serves to absorb or release heat to regulate heat transfer across the bag 402. Thus, for example, during storage of the food item 404, the phase change material can absorb heat that would otherwise be conducted from an outside environment to the food item 404. In such manner, the food item 404 can be maintained at a relatively low temperature or a relatively low range of temperatures for a prolonged period of time, thereby retaining its freshness and prolonging its shelf-life. Advantageously, the use of the phase change material allows the bag 402 to provide thermal regulation on an "as-needed" basis, dependent upon a temperature of the food item 404 and a temperature of the outside environment. The selection of materials forming the bag 402 can be dependent upon other considerations, such as biodegradability of the bag 402.

The use of specific materials and other specific implementation features can further enhance thermal regulating characteristics of the bag 402. For example, as further described below, a latent heat, a transition temperature, a loading level, and a distribution of the phase change material can contribute to the thermal regulating characteristics of the bag 402. As another example, a label (not illustrated in FIG. 4) can be included so as to cover the bag 402. Such a label can be formed so as to include the same or a different phase change material, which serves to absorb or release heat to regulate heat transfer across the label.

Food Container Holders

Figure 5:
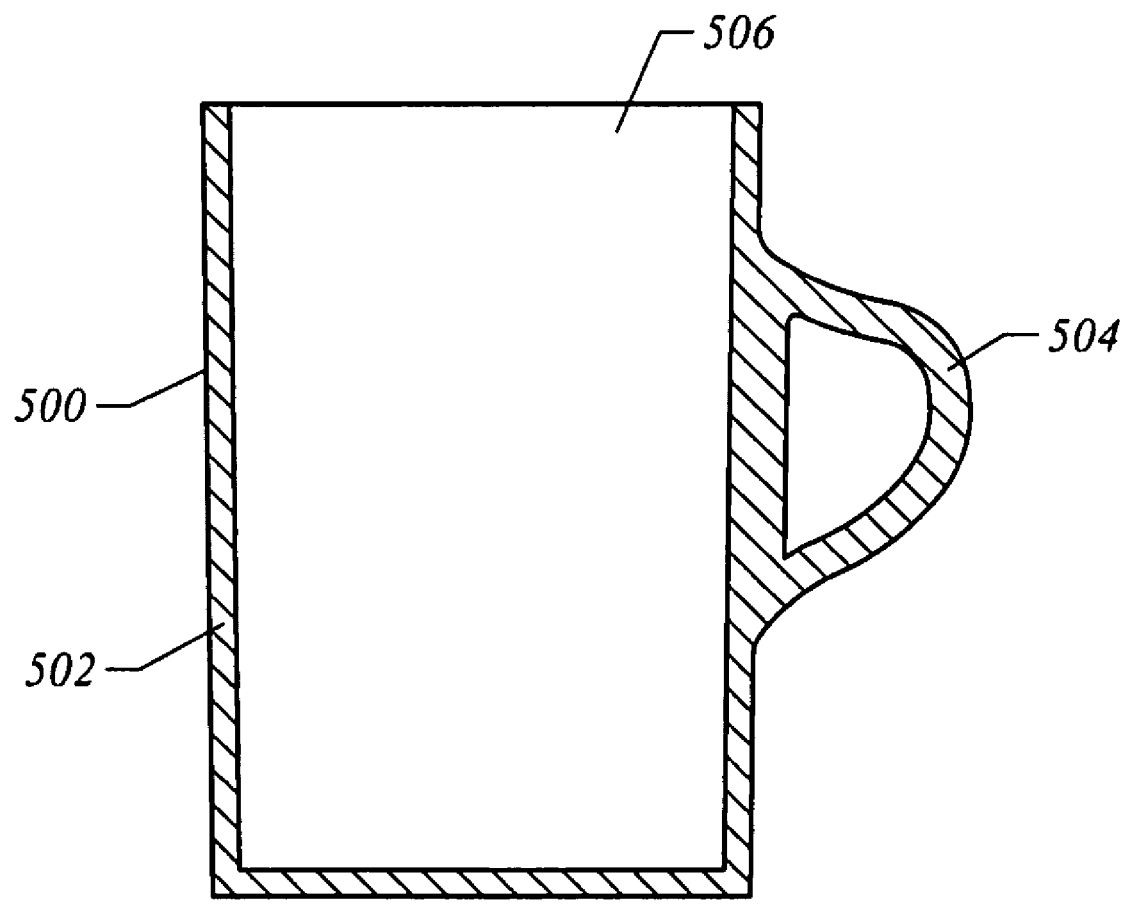
FIG. 5 illustrates a food container holder that is implemented in accordance with an embodiment of the invention.

Attention next turns to FIG. 5, which illustrates a side, cross-sectional view of a food container holder 500 that is implemented in accordance with an embodiment of the invention. In the illustrated embodiment, the food container holder 500 is implemented to receive and to contain a food container (not illustrated in FIG. 5). For example, the food container can be a beverage bottle or a beverage can containing a soft drink, or the beverage container can be a cup containing coffee or tea. Advantageously, the food container holder 500 is implemented to provide thermal regulation by adjusting heat transfer between an outside environment and contents of a food container that is contained within the food container holder 500. For example, after a beverage bottle is removed from a refrigerator or a cooler, a soft drink that is contained within the beverage bottle has an undesirable tendency to warm up via one or more modes of heat transfer, and the food container holder 500 is implemented to counteract this undesirable tendency.

Referring to FIG. 5, the food container holder 500 includes a body portion 502 and a handle portion 504 that is adjacent to the body portion 502. The body portion 502 defines an internal compartment 506 within which a food container can be positioned. For example, the food container can be a beverage bottle or a beverage can, and the internal compartment 506 can be dimensioned to receive the beverage bottle or the beverage can. In the illustrated embodiment, the handle portion 504 is formed integrally with the body portion 502. However, it is contemplated that the handle portion 504 can be coupled to the body portion 502 using any suitable fastening mechanism, such as an adhesive. It is also contemplated that the handle portion 504 can be implemented as a set of straps to secure the food container holder 500 to a body of a consumer or another object.

As illustrated in FIG. 5, the body portion 502 and the handle portion 504 are formed of any suitable materials, such as ceramics, fibrous materials, glasses, metals, or polymers. The body portion 502 and the handle portion 504 can be formed of the same material or different materials. In the illustrated embodiment, at least one of the body portion 502 and the handle portion 504 is also formed of a phase change material, which serves to absorb or release heat to regulate heat transfer across the food container holder 500. Thus, for example, as a consumer holds the food container holder 500 during use, the phase change material can absorb heat that would otherwise be conducted from the consumer's hand to contents of a food container that is contained within the food container holder 500. In such manner, the contents of the food container can be maintained at a relatively low temperature or a relatively low range of temperatures for a prolonged period of time. Advantageously, the use of the phase change material allows the food container holder 500 to provide thermal regulation on an "as-needed" basis. In particular, since the consumer can intermittently hold the food container holder 500, the phase change material can absorb heat primarily during those periods of time when the consumer is actually holding the food container holder 500. It is contemplated that the phase change material can release heat back to the outside environment during those periods of time when the consumer is not actually holding the food container holder 500. The selection of materials forming the food container holder 500 can be dependent upon other considerations, such as whether the food container holder 500 is implemented for disposable use or for longer-term use.

The use of specific materials and other specific implementation features can further enhance thermal regulating characteristics of the food container holder 500. For example, as further described below, a latent heat, a transition temperature, a loading level, and a distribution of the phase change material can contribute to the thermal regulating characteristics of the food container holder 500. In particular, it is contemplated that the phase change material can be distributed so as to provide sufficient coverage of those portions of the food container holder 500 that are typically in contact with a food container or with a consumer's hand during use.

Implementations of Food Containers and Food Container Holders

Figure 6:
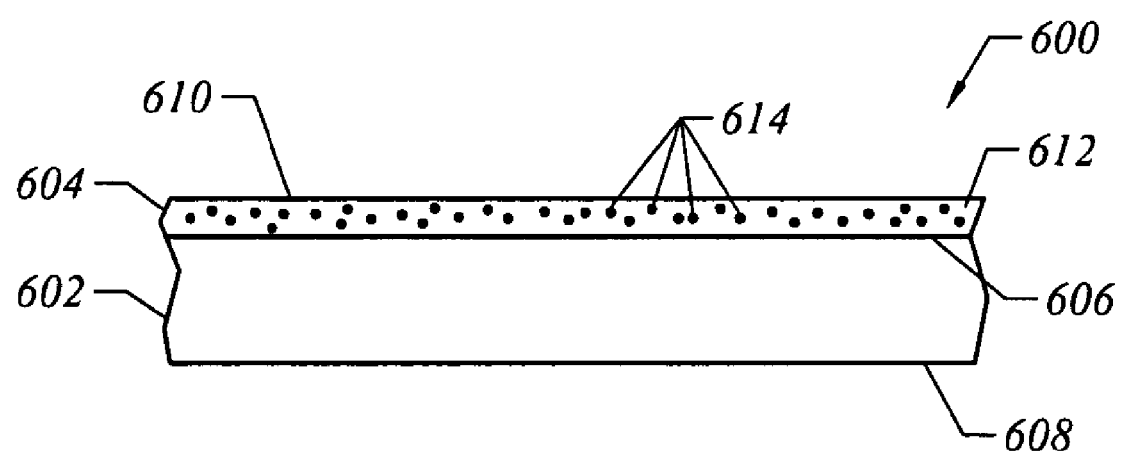
FIG. 6 illustrates a cross-sectional view of a portion of a food container or a food container holder, according to an embodiment of the invention.

The foregoing provides a general overview of some embodiments of the invention. Attention next turns to FIG. 6, which illustrates a cross-sectional view of a portion 600 of a food container or a food container holder, according to an embodiment of the invention. For example, the portion 600 can be a neck portion or a body portion of a beverage bottle, or the portion 600 can be a label for the beverage bottle. As another example, the portion 600 can be a body portion of a beverage can. As a further example, the portion 600 can be a body portion or a handle portion of a food container holder. As illustrated in FIG. 6, the portion 600 includes a first layer 602 and a second layer 604 that is adjacent to the first layer 602.

In the illustrated embodiment, the first layer 602 is implemented as a substrate and is formed of any suitable material, such as a ceramic, a fibrous material, a glass, a metal, or a polymer. Thus, for example, the first layer 602 can be formed of aluminum, paper, a polyester, a polyolefin such as polyethylene or polypropylene, or a polyvinyl such as polystyrene. The selection of a material forming the first layer 602 can be dependent upon other considerations, such as based on its ability to facilitate formation of the second layer 604, its ability to reduce or eliminate heat transfer, its flexibility, its ability to be molded or shaped into a desired form, its resistance to degradation under ambient or processing conditions, its biodegradability, its toxicity, and its mechanical strength. While not illustrated in FIG. 6, it is contemplated that the first layer 602 can be formed so as to include two or more sub-layers, which can be formed of the same material or different materials. For certain implementations, at least one of the sub-layers can be formed of a metal, such as in the form of a coating of the metal. As can be appreciated, such implementation of the first layer 602 can be referred to as a "metallized" form of the first layer 602. Such metallized form can be desirable, since a coating of a metal can provide enhanced mechanical strength and shelf-life as well as serve to reflect heat from sunlight or another light source, thus reducing heat transfer across the portion 600. It is also contemplated that the first layer 602 can be formed so as to include a set of internal compartments that contain an insulation material, such as in the form of air pockets. As can be appreciated, such implementation of the first layer 602 can be referred to as a "cavitated" or "foamed" form of the first layer 602. Such cavitated form can be desirable, since air pockets can serve to further reduce heat transfer across the portion 600.

As illustrated in FIG. 6, the second layer 604 is implemented as a coating that is formed adjacent to the first layer 602 using any suitable coating or printing technique. During use, the second layer 604 can be positioned so that it is adjacent to an internal compartment, thus serving as an inner coating. It is also contemplated that the second layer 604 can be positioned so that it is exposed to an outside environment, thus serving as an outer coating. Referring to FIG. 6, the second layer 604 at least partly covers a surface 606 of the first layer 602. Depending on characteristics of the first layer 602 or a specific coating or printing technique used, the second layer 604 can extend below the surface 606 and at least partly permeate the first layer 602. While two layers are illustrated in FIG. 6, it is contemplated that the portion 600 can include more or less layers for other implementations. In particular, it is contemplated that a third layer (not illustrated in FIG. 6) can be included so as to at least partly cover another surface 608 of the first layer 602 or a surface 610 of the second layer 604. Such a third layer can be implemented in a similar fashion as the second layer 604. It is also contemplated that a material or materials forming the second layer 604 can be included within the first layer 602, so that the second layer 604 can be omitted.

In the illustrated embodiment, the second layer 604 is formed of a binder 612 and a phase change material 614 that is dispersed in the binder 612. The binder 612 can be any suitable material that serves as a matrix within which the phase change material 614 is dispersed, and that couples the phase change material 614 to the first layer 602. The binder 612 can provide other desired functionality, such as offering a degree of protection to the phase change material 614 against ambient or processing conditions or against loss or leakage during processing or during use. For example, the binder 612 can be an ink medium, a polymer, or a varnish. The selection of the binder 612 can be dependent upon other considerations, such as based on its affinity for the phase change material 614, its reactivity or lack of reactivity with the phase change material 614, its ability to reduce or eliminate heat transfer, its flexibility, its coating-forming ability; its resistance to degradation under ambient or processing conditions, its biodegradability, its toxicity, and its mechanical strength. Thus, for example, the binder 612 can be selected based on its affinity for the phase change material 614 so as to facilitate dispersion of the phase change material 614 within the binder 612. Such affinity can be dependent upon, for example, similarity in solubility parameters, polarities, hydrophobic characteristics, or hydrophilic characteristics of the binder 612 and the phase change material 614. Advantageously, such affinity can facilitate incorporation of a higher loading level as well as a more uniform distribution of the phase change material 614 within the second layer 604. In addition, a smaller amount of the binder 612 can be required to incorporate a desired loading level of the phase change material 614, thus allowing for a reduced thickness of the second layer 604 and improved flexibility of the portion 600. As further described below, a set of microcapsules can be included to contain the phase change material 614, and the binder 612 can be selected based on its affinity for the microcapsules. For example, the binder 612 can be selected to be the same as or similar to a material forming the microcapsules. For implementations in which the binder 612 is likely to come into contact with a food item or with a skin of a consumer, the binder 612 can be selected based on its level of safety. For example, the binder 612 can be selected so that it has an acceptable level of toxicity when ingested or causes an acceptable level of irritation when contacted with a skin of a consumer. In addition, the selection of the binder 612 can be dependent upon reducing environmental concerns posed by the binder 612. For example, the binder 612 can be selected so that it is derived from naturally occurring or renewable sources or is biodegradable, thus reducing adverse impacts on the environment.

Referring to FIG. 6, the phase change material 614 serves to absorb or release heat to regulate heat transfer across the portion 600. In the illustrated embodiment, the phase change material 614 is implemented in a non-encapsulated form, such as a powder or a set of domains that are dispersed in the binder 612. For example, the binder 612 can be selected so as to have a partial or slight affinity for the phase change material 614. Such partial affinity can be adequate to facilitate dispersion of the phase change material 614 and to facilitate processing at higher temperatures. At lower temperatures and shear conditions and once the second layer 604 has been formed, such partial affinity can allow the phase change material 614 to separate out. In particular, such partial affinity can lead to insolubilization of the phase change material 614 and formation of domains within the binder 612. Advantageously, such domains can lead to improved thermal regulating characteristics by facilitating transition of the phase change material 614 between two states. In addition, such domains can serve to reduce or prevent loss or leakage of the phase change material 614 during processing or during use.

It is also contemplated that a containment structure can be included to contain, to absorb, or to react with the phase change material 614. For example, a set of microcapsules can be included to contain the phase change material 614. For certain implementations, the microcapsules can be formed as shells that define internal compartments within which the phase change material 614 is positioned. The microcapsules can have the same shape or different shapes, and can have the same size or different sizes. In some instances, the microcapsules can be substantially spheroidal or spherical, and can have sizes ranging from about 0.01 to about 4,000 microns, such as from about 0.1 to about 1,000 microns, from about 0.1 to about 500 microns, from about 0.1 to about 100 microns, or from about 0.5 to about 50 microns. Thus, for example, the microcapsules can have sizes ranging from about 0.5 to about 15 microns when using certain aqueous coating or printing techniques, while the microcapsules can have sizes ranging from about 15 to about 25 microns when using certain non-aqueous coating or printing techniques. For certain implementations, it can be desirable that a substantial fraction, such as at least 50 percent, at least 60 percent, at least 70 percent, or at least 80 percent, of the microcapsules have sizes within a specified range, such as from about 0.5 to about 15 microns or from about 15 to about 25 microns. It can also be desirable that the microcapsules are monodisperse with respect to either of, or both, their shapes and sizes. Examples of techniques to form the microcapsules can be found in the following references: Tsuei et al., U.S. Pat. No. 5,589,194, entitled "Method of Encapsulation and Microcapsules Produced Thereby;" Tsuei, et al., U.S. Pat. No. 5,433,953, entitled "Microcapsules and Methods for Making Same;" Hatfield, U.S. Pat. No. 4,708,812, entitled "Encapsulation of Phase Change Materials;" and Chen et al., U.S. Pat. No. 4,505,953, entitled "Method for Preparing Encapsulated Phase Change Materials;" the disclosures of which are herein incorporated by reference in their entireties.

Microcapsules can be formed of any suitable material that serves to contain the phase change material 614, thus offering a degree of protection to the phase change material 614 against ambient or processing conditions or against loss or leakage during processing or during use. For example, the microcapsules can be formed of a polymer or any other encapsulation material. For certain implementations, the microcapsules can be formed of gelatin or gum arabic in a water-based complex coacervation system, or the microcapsules can be formed of melamine-formaldehyde or urea-formaldehyde by in-situ polymerization. The selection of a material forming the microcapsules can be dependent upon other considerations, such as based on its affinity for the binder 612, its reactivity or lack of reactivity with the phase change material 614, its resistance to degradation under ambient or processing conditions, its biodegradability, its toxicity, and its mechanical strength. For implementations in which the microcapsules are likely to come into contact with a food item or with a skin of a consumer, a material forming the microcapsules can be selected based on its level of safety. For example, the material can be selected so that it has an acceptable level of toxicity when ingested or causes an acceptable level of irritation. when contacted with a skin of a consumer. In addition, the selection of a material forming the microcapsules can be dependent upon reducing environmental concerns posed by the microcapsules. For example, the material can be selected as one derived from naturally occurring or renewable sources or one that is biodegradable, thus reducing adverse impacts on the environment. Examples of materials that can be used for forming the microcapsules include gelatins; polymers, such as polyhydroxyalkonates, polyacrylics, polyamides, polyesters, polyethers, polycarbonates, polyurethanes, polyvinyls, natural polymers such as cellulose and waxes, and ether and ester derivatives of cellulose including cellulose acetate and cellulose nitrate; shellacs; rosins; and cross-linked triglyceride oils, such as "alkyds" and linseed oil. Other types of containment structures can be used in place of, or in conjunction with, the microcapsules. Examples of other types of containment structures include silica particles, such as precipitated silica particles or fumed silica particles; zeolite particles; carbon particles, such as graphite particles or activated carbon particles; and absorbent or superabsorbent materials.

The selection of the phase change material 614 can be dependent upon a latent heat and a transition temperature of the phase change material 614. A latent heat of the phase change material 614 typically correlates with its ability to regulate heat transfer. In some instances, the phase change material 614 can have a latent heat that is at least about 40 J/g, such as at least about 50 J/g, at least about 60 J/g, at least about 70 J/g, at least about 80 J/g, at least about 90 J/g, or at least about 100 J/g. Thus, for example, the phase change material 614 can have a latent heat ranging from about 40 J/g to about 400 J/g, such as from about 60 J/g to about 400 J/g, from about 80 J/g to about 400 J/g, or from about 100 J/g to about 400 J/g. A transition temperature of the phase change material 614 typically correlates with a desired temperature or a desired range of temperatures that can be maintained by the phase change material 614. In some instances, the phase change material 614 can have a transition temperature ranging from about −10° C. to about 110° C., such as from about 0° C. to about 100° C. For maintaining a food item at relatively low temperatures for a prolonged period of time, it has been discovered that a transition temperature that is within a specific range at or below normal skin temperature can be particularly desirable. In particular, the transition temperature desirably ranges from about 0° C. to about 32° C., such as from about 22° C. to about 32° C. or from about 27° C. to about 29° C. For maintaining a food item at relatively high temperatures for a prolonged period of time, it has been discovered that a transition temperature that is within a specific range at or above normal skin temperature can be particularly desirable. In particular, the transition temperature desirably ranges from about 32° C. to about 66° C., such as from about 55° C. to about 65° C. or from about 61° C. to about 63° C. The selection of the phase change material 614 can be dependent upon other considerations, such as its affinity for the binder 612, its reactivity or lack of reactivity with the binder 612, its resistance to degradation under ambient or processing conditions, its biodegradability, its toxicity, and its mechanical strength.

Examples of substances that can be used as the phase change material 614 include a variety of organic and inorganic substances. For certain implementations, the phase change material 614 can include a hydrocarbon, such as a straight chain alkane or a paraffinic hydrocarbon, a branched-chain alkane, an unsaturated hydrocarbon, a halogenated hydrocarbon, or an alicyclic hydrocarbon. Thus, for example, the phase change material 614 can include a paraffinic hydrocarbon having n carbon atoms, namely a $C_n$ paraffinic hydrocarbon with n being a positive integer. Table 1 sets forth a list of $C_{13}$-$C_{28}$ paraffinic hydrocarbons that can be used as the phase change material 614. As can be appreciated, the number of carbon atoms of a paraffinic hydrocarbon typically correlates with its melting point. For example, n-Eicosane, which includes 20 straight chain carbon atoms per molecule, has a melting point of 36.8° C. By comparison, n-Tetradecane, which includes 14 straight chain carbon atoms per molecule, has a melting point of 5.9° C.

TABLE 1

| Paraffinic Hydrocarbon | No. of Carbon Atoms | Melting Point (° C.) |
|---|---|---|
| n-Octacosane | 28 | 61.4 |
| n-Heptacosane | 27 | 59.0 |
| n-Hexacosane | 26 | 56.4 |
| n-Pentacosane | 25 | 53.7 |
| n-Tetracosane | 24 | 50.9 |
| n-Tricosane | 23 | 47.6 |
| n-Docosane | 22 | 44.4 |
| n-Heneicosane | 21 | 40.5 |
| n-Eicosane | 20 | 36.8 |
| n-Nonadecane | 19 | 32.1 |
| n-Octadecane | 18 | 28.2 |
| n-Heptadecane | 17 | 22.0 |
| n-Hexadecane | 16 | 18.2 |
| n-Pentadecane | 15 | 10.0 |
| n-Tetradecane | 14 | 5.9 |
| n-Tridecane | 13 | −5.5 |

Other examples of substances that can be used as the phase change material 614 include polyhydric alcohols, which undergo a transition between two solid states, such as via a crystalline or mesocrystalline phase transformation, and hence typically does not become a liquid during use. Examples of polyhydric alcohols include 2,2-dimethyl-1,3-propanediol, 2-hydroxymethyl-2-methyl-1,3-propanediol, ethylene glycol, polyethylene glycol, pentaerythritol, dipentaerythritol, pentaglycerine, tetramethylol ethane, neopentyl glycol, tetramethylol propane, 2-amino-2-methyl-1,3-propanediol, monoaminopentaerythritol, diaminopentaerythritol, and tris(hydroxy methyl)acetic acid.

For other implementations, the phase change material 614 can include a polymer having a desired latent heat and a desired transition temperature. In some instances, such a polymer is desirably a linear polymer or a polymer with a relatively small amount of branching to allow for a greater density and a greater degree of ordered molecular packing and crystallization. A greater degree of ordered molecular packing and crystallization can lead to a larger latent heat and a narrower temperature stabilizing range, such as in the form of a well-defined transition temperature. Polymers that can be used as the phase change material 614 include homopolymers, copolymers, and mixtures thereof. Characteristics of one or more types of monomer units forming a polymer can affect a latent heat and a transition temperature of the polymer. Accordingly, the selection of the monomer units can be dependent upon a desired application of the phase change material 614.

In some instances, the phase change material 614 desirably includes a polymer as a result of its higher molecular weight, its larger molecular size, or its higher viscosity relative to non-polymeric substances, such as paraffinic hydrocarbons. As a result of these characteristics, such a polymer can exhibit a lesser tendency to leak during processing or during use. For example, polymers that can be used as the phase change material 614 can have a number average molecular weight ranging from about 400 to about 5,000,000, such as from about 2,000 to about 5,000,000, from about 8,000 to about 100,000, or from about 8,000 to about 15,000. When incorporated within the second layer 604, its larger molecular size or higher viscosity can inhibit such a polymer from flowing through the binder 612. In conjunction with providing thermal regulation, such a polymer can provide improved mechanical strength when incorporated within the second layer 604. In particular, it is contemplated that such a polymer can provide adequate mechanical strength so that it can be used to form the second layer 604 without requiring the binder 612, thus allowing for a higher loading level of the phase change material 614 and improved thermal regulating characteristics.

Examples of polymers that can be used as the phase change material 614 include polyethylene glycols. As can be appreciated, the number average molecular weight of a polyethylene glycol typically correlates with its melting point. For example, polyethylene glycols having a number average molecular weight in the range of about 570 to about 630 (e.g., Carbowax™ 600, available from The Dow Chemical Company, Midland, Mich.) typically have a melting point of about 20° C. to about 25° C., making them desirable for maintaining a food item at relatively low temperatures. Other polyethylene glycols that are useful include polyethylene glycols having a number average molecular weight of about 400 and a melting point in the range of about 4° C. to about 8° C., polyethylene glycols having a number average molecular weight in the range of about 1,000 to about 1,500 and a melting point in the range of about 42° C. to about 48° C., and polyethylene glycols having a number average molecular weight of about 6,000 and a melting point in the range of about 56° C. to about 63° C. (e.g., Carbowax™ 400, 1500, and 6000, available from The Dow Chemical Company, Midland, Mich.).

Other examples of polymers that can be used as the phase change material 614 include polymers based on polyethylene glycols that are endcapped with fatty acids. For example, polytetramethylene glycol fatty acid diesters having a melting point in the range of about 22° C. to about 35° C. can be formed from polyethylene glycols having a number average molecular weight in the range of about 400 to about 600 that are endcapped with stearic acid or lauric acid. Additional examples of polymers that can be used as the phase change material 614 include polymers based on tetramethylene glycol. For example, polytetramethylene glycols having a number average molecular weight in the range of about 1,000 to about 1,800 (e.g., Terathane® 1000 and 1800, available from DuPont Inc., Wilmington, Del.) typically have a melting point in the range of about 19° C. to about 36° C. Polyethylene oxides having a melting point in the range of about 60° C. to about 65° C. also can be used as the phase change material 614 for certain implementations.

Additional examples of polymers that can be used as the phase change material 614 include homopolymers having a melting point in the range of about 0° C. to about 50° C. These homopolymers can be formed of a variety of monomer units using any suitable polymerization technique. Table 2 sets forth a list of homopolymers that can be used as the phase change material 614.

TABLE 2

| Class of Monomer Unit | Homopolymer | Melting Point (° C.) |
|---|---|---|
| Acrylates, Methacrylates, and and Acrylamides | Polyoctadecyl methacrylate | 36 |
| | Polyhexadecyl methacrylate | 22 |
| | Poly-N-tetradecyl polyacrylamide | 18 |
| | Poly-N-tetradecyl polyacrylamide-1,1 dihydroperfluoro | 32-35 |
| Alkanes and Alkenes | Poly-1-decene | 34-40 |
| | Poly-1-heptene | 17 |
| | cis-polyoctenamer (Vestenamer ® 6213, available from Degussa AG, Frankfurt, Germany) | 38 |
| | Poly-1-octene | 5-10 |

TABLE 2-continued

| Class of Monomer Unit | Homopolymer | Melting Point (° C.) |
|---|---|---|
| | Poly-1-nonene | 19-22 |
| | trans-polypentemer | 23-34 |
| | Poly-1-undecene | 36 |
| | cis-polyisoprene | 28-36 |
| | syndiotactic 1,2-poly(1,3-pentadiene) | 10 |
| | 1-methyl-polydodecamethylene | 30 |
| Ethers | Polymethyleneoxytetramethylene oxide (Poly-1,3-dioxepane) | 30 |
| | Polyhexamethyleneoxymethylene oxide | 38 |
| | Polyoxacyclobutane (POX) | 34-36 |
| | n-octadecyl polyacetaldehyde | 18 |
| | Polytetramethylene glycol 1000 (Terathane ® polyTHF 1000, available from DuPont Inc., Wilmington, Delaware) | 25-33 |
| | Polytetramethylene glycol 1400 (Terathane ® polyTHF 1400, available from DuPont Inc., Wilmington, Delaware) | 27-35 |
| | Polytetramethylene glycol 1800 (Terathane ® polyTHF 1800, available from DuPont Inc., Wilmington, Delaware) | 27-38 |
| | Polytetramethylene glycol 2000 (Terathane ® polyTHF 2000, available from DuPont Inc., Wilmington, Delaware) | 28-40 |
| Vinyls | Polydodecyl vinyl ether | 30 |
| | Polyvinyl laurate | 16 |
| | Polyvinyl myristate | 28 |
| Sulfur Containing Compounds | 3,3-dimethyl-polytrimethylene sulfide | 19 |
| | Polymethylene sulfide | 35 |
| | Polytetramethylene disulfide | 39-44 |
| | Polysulfur trioxide | 32 |
| | 1-methyl-trimethylene-poly-sulfonyldivalerate | 35 |
| Silicon Containing Compounds | beta-2-polydiethyl siloxane | 17 |
| | Nonamethylene-poly-disiloxanylene dipropionamide-diethyl, dimethyl (Si) | 10 |
| | Nonamethylene-poly-disiloxanylene dipropionamide-tetraethyl (Si) | 10 |
| | Polymethyl hexadecyl siloxane | 35 |
| Amides and Nitrogen Containing Compounds | Poly-(hexamethylene)cyclopropylene dicarboxamide-cis-N,N'-dibutyl | 20 |
| | Poly-(hexamethylene)cyclopropylene dicarboxamide-cis-N,N'-diethyl | 5 |
| | Poly-(hexamethylene)cyclopropylene dicarboxamide-cis-N,N'-diisopropyl | 20 |
| | Poly-(hexamethylene)cyclopropylene dicarboxamide-cis-N,N'-dimethyl | 30 |
| | Polypentamethylene adipamide-2,2,3,3,4,4 hexafluoro (diamine)-cis-N,N'-dibutyl | 15 |
| | Polypentamethylene adipamide-2,2,3,3,4,4 hexafluoro (diamine)-cis-N,N'-diethyl | 20 |
| | Polypentamethylene adipamide-2,2,3,3,4,4 hexafluoro (diamine)-cis-N,N'-diisopropyl | 35 |
| | Polypentamethylene adipamide-2,2,3,3,4,4 hexafluoro (diamine)-cis-N,N'-dimethyl | 30 |
| | Poly-(4,4'-methylene diphenylene sebacamide)-N,N'-diethyl | 32 |
| | Polypentamethylene (hexamethylene disulfonyl)-dicaproamide | 25 |
| Esters | Poly-[ethylene 4,4'-oxydimethylene-di-2-(1,3-dioxolane)-caprylate] | 19 |
| | Polypentamethylene adipate-2,2,3,3,4,4 hexa fluoro | 34 |
| | (4-methyl-(R+)-7-polyhydroxyenanthic acid) | 36 |
| | Poly-[4-hydroxy tetramethylene-2-(1,3-dioxolane) caprylic acid] (cis or trans) | 23 |
| | Polypentamethylene 2,2'-dibenzoate | 13 |
| | Polytetramethylene 2,2'-dibenzoate | 36 |
| | Poly-1-methyl-trimethylene 2,2' dibenzoate | 38 |
| | Polycaprolactone glycol (Molecular weight = 830) | 35-45 |

Further examples of polymers that can be used as the phase change material 614 include polyesters having a melting point in the range of about 0° C. to about 40° C. These polyesters can be formed by, for example, polycondensation of glycols (or their derivatives) with diacids (or their derivatives). Table 3 sets forth a list of polyesters that can be formed with different combinations of glycols and diacids.

TABLE 3

| Glycol | Diacid | Melting Point (° C.) |
|---|---|---|
| Ethylene glycol | Carbonic | 39 |
| Ethylene glycol | Pimelic | 25 |
| Ethylene glycol | Diglycolic | 17-20 |
| Ethylene glycol | Thiodivaleric | 25-28 |
| 1,2-Propylene glycol | Diglycolic | 17 |
| Propylene glycol | Malonic | 33 |
| Propylene glycol | Glutaric | 35-39 |
| Propylene glycol | Diglycolic | 29-32 |
| Propylene glycol | Pimelic | 37 |
| 1,3-butanediol | Sulphenyl divaleric | 32 |
| 1,3-butanediol | Diphenic | 36 |
| 1,3-butanediol | Diphenyl methane-m,m'-diacid | 38 |
| 1,3-butanediol | trans-H,H-terephthalic acid | 18 |
| Butanediol | Glutaric | 36-38 |
| Butanediol | Pimelic | 38-41 |
| Butanediol | Azelaic | 37-39 |
| Butanediol | Thiodivaleric | 37 |
| Butanediol | Phthalic | 17 |
| Butanediol | Diphenic | 34 |
| Neopentyl glycol | Adipic | 37 |
| Neopentyl glycol | Suberic | 17 |
| Neopentyl glycol | Sebacic | 26 |
| Pentanediol | Succinic | 32 |
| Pentanediol | Glutaric | 22 |
| Pentanediol | Adipic | 36 |
| Pentanediol | Pimelic | 39 |
| Pentanediol | para-phenyl diacetic acid | 33 |
| Pentanediol | Diglycolic | 33 |
| Hexanediol | Glutaric | 28-34 |
| Hexanediol | 4-Octenedioate | 20 |
| Heptanediol | Oxalic | 31 |
| Octanediol | 4-Octenedioate | 39 |
| Nonanediol | meta-phenylene diglycolic | 35 |
| Decanediol | Malonic | 29-34 |
| Decanediol | Isophthalic | 34-36 |
| Decanediol | meso-tartaric | 33 |
| Diethylene glycol | Oxalic | 10 |
| Diethylene glycol | Suberic | 28-35 |
| Diethylene glycol | Sebacic | 36-44 |
| Diethylene glycol | Phthalic | 11 |
| Diethylene glycol | trans-H,H-terephthalic acid | 25 |
| Triethylene glycol | Sebacic | 28 |
| Triethylene glycol | Sulphonyl divaleric | 24 |
| Triethylene glycol | Phthalic | 10 |
| Triethylene glycol | Diphenic | 38 |
| para-dihydroxy-methyl benzene | Malonic | 36 |
| meta-dihydroxy-methyl benzene | Sebacic | 27 |
| meta-dihydroxy-methyl benzene | Diglycolic | 35 |

In some instances, a non-polymeric substance can be reacted with a polymer to form a resulting polymer having a desired latent heat and a desired transition temperature. Thus, for example, n-octadecylic acid (i.e., stearic acid) can be reacted or esterified with polyvinyl alcohol to yield polyvinyl stearate, or dodecanoic acid (i.e., lauric acid) can be reacted or esterified with polyvinyl alcohol to yield polyvinyl laurate. A variety of non-polymeric substances with different functional groups can be reacted with a variety polymers to yield resulting polymers having desired latent heats and desired transition temperatures.

Polymers having desired latent heats and desired transition temperatures can be formed of a variety of monomer units. For example, similar to polyoctadecyl methacrylate, polymers can be formed by polymerizing octadecyl methacrylate, which can be formed by esterification of octadecyl alcohol with methacrylic acid. Also, polymers can be formed by polymerizing a polymer or a mixture of polymers. For example, poly-(polyethylene glycol) methacrylate, poly-(polyethylene glycol) acrylate, poly-(polytetramethylene glycol) methacrylate, and poly-(polytetramethylene glycol) acrylate can be formed by polymerizing polyethylene glycol methacrylate, polyethylene glycol acrylate, polytetramethylene glycol methacrylate, and polytetramethylene glycol acrylate, respectively. In this example, monomer units can be formed by esterification of polyethylene glycol (or polytetramethylene glycol) with methacrylic acid (or acrylic acid). It is contemplated that polyglycols can be esterified with allyl alcohol or trans-esterified with vinyl acetate to form polyglycol vinyl ethers, which in turn can be polymerized to form poly-(polyglycol) vinyl ethers. In a similar manner, it is contemplated that polymers can be formed from homologues of polyglycols, such as ester or ether endcapped polyethylene glycols and polytetramethylene glycols.

For implementations in which the phase change material 614 is likely to come into contact with a food item or with a skin of a consumer, the phase change material 614 can be selected based on its level of safety. For example, the phase change material 614 can be selected so that it has an acceptable level of toxicity when ingested or causes an acceptable level of irritation when contacted with a skin of a consumer. In addition, the selection of the phase change material 614 can be dependent upon reducing environmental concerns posed by the phase change material 614. For example, the phase change material 614 can be selected as one derived from naturally occurring or renewable sources or one that is biodegradable, thus reducing adverse impacts on the environment. Examples of substances having acceptable levels of safety or biodegradability include natural triglyceride oils, such as coconut oil and cotton seed oil; natural acids, such as acetic acid, lactic acid, capric acid, lauric acid, and other fatty acids; natural alcohols, such as lauryl alcohol, palmityl alcohol, and other fatty alcohols; natural alcohol esters, such as palmityl acetate; natural acid esters, such as methyl laurate, methyl myristate, methyl palmitate, methyl stearate, and other fatty acid esters derived from animal or plant sources; natural acid amides, such as fatty acid amides; natural waxes; resins; rosins; shellacs, such as beeswax, wood rosin, rubber, and cis-polyisoprene; non-corrosive hydrated salts, such as calcium chloride hexahydrate, magnesium nitrate hexahydrate, ammonium alum, magnesium chloride hexahydrate, sodium carbonate decahydrate, disodium phosphate dodecahydrate, sodium sulfate decahydrate, and sodium acetate trihydrate; glycols; glycol esters and ethers, such as polyethylene glycol 400 distearate; ethers; polymers with fatty acid side chains, such as polyvinyl palmitate, polyvinyl stearate, and polystearyl vinyl ether; polyamides; and polyesters, such as polyneopentyl sebecate and polyethylene pimelate. Particularly useful substances include fatty acid esters derived from animal or plant sources, since these substances can provide desired thermal regulating characteristics while posing reduced safety and environmental concerns.

Depending upon specific characteristics desired for the portion 600, the second layer 604 can cover from about 1 to about 100 percent of the surface 606 of the first layer 602. Thus, for example, the second layer 604 can cover from about 20 to about 100 percent, from about 50 to about 100 percent, or from about 80 to about 100 percent of the surface 606. When thermal regulating characteristics of the portion 600 are a controlling consideration, the second layer 604 can cover a larger percentage of the surface 606. On the other hand, when other characteristics of the portion 600 are a controlling consideration, the second layer 604 can cover a smaller percentage of the surface 606. Alternatively, or in conjunction, when balancing thermal regulating and other characteristics of the portion 600, it can be desirable to adjust a thickness of the second layer 604 or a loading level of the phase change material 614 within the second layer 604.

For certain implementations, the second layer 604 can have a loading level of the phase change material 614 ranging from about 1 to about 100 percent by weight of the phase change material 614. Thus, for example, the second layer 604 can have a loading level ranging from about 10 to about 90 percent, from about 10 to about 70 percent, from about 10 to about 50 percent, or from about 20 to about 30 percent by weight of the phase change material 614. For implementations in which a set of microcapsules are included to contain the phase change material 614, the second layer 604 can have a loading level of the microcapsules that is appropriately adjusted to account for a weight of shells forming the microcapsules. Thus, for example, the second layer 604 can have a loading level that is up to about 75 percent by dry weight of the microcapsules containing the phase change material 614, such as from about 5 to about 75 percent, from about 10 to about 50 percent, from about 10 to about 40 percent, or from about 25 to about 35 percent by dry weight of the microcapsules containing the phase change material 614. When thermal regulating characteristics of the portion 600 are a controlling consideration, the second layer 604 can have a higher loading level of the phase change material 614. On the other hand, when other characteristics of the portion 600 are a controlling consideration, the second layer 604 can have a lower loading level of the phase change material 614. Alternatively, or in conjunction, when balancing thermal regulating and other characteristics of the portion 600, it can be desirable to adjust a thickness of the second layer 604 or a percentage of the surface 606 that is covered by the second layer 604. It is also contemplated that the second layer 604 can be formed so as to include an additional phase change material (not illustrated in FIG. 6) that is dispersed in the binder 612. Such additional phase change material can differ in some fashion from the phase change material 614, such as by having a different transition temperature. Thus, for example, such additional phase change material can be selected to have a transition temperature for maintaining a food item at relatively high temperatures, while the phase change material 614 can be selected to have a transition temperature for maintaining a food item at relatively low temperatures.

In some instances, the second layer 604 can be formed so as to provide substantially uniform characteristics across the surface 606 of the first layer 602. Thus, as illustrated in FIG. 6, the phase change material 614 is substantially uniformly distributed within the second layer 604. Such uniformity in distribution of the phase change material 614 can serve to inhibit heat from being preferentially and undesirably conducted across a section of the portion 600 that includes a lesser density of the phase change material 614 than another section. Such uniformity in distribution can also provide a more even "feel" to the portion 600. However, depending upon specific characteristics desired for the portion 600, the distribution of the phase change material 614 can be varied from that illustrated in FIG. 6. Thus, for example, the phase change material 614 can be concentrated within the second layer 604 or distributed in accordance with a concentration profile along one or more directions within the second layer 604.

During formation of the portion 600, an aqueous or non-aqueous blend can be formed by mixing the binder 612 with the phase change material 614, which can be provided in a liquid form or a solid form. For certain implementations, a set of microcapsules can be included to contain the phase change material 614, and the microcapsules can be provided as a dry, free flowing powder. In some instances, a set of additives can be added when forming the blend. For example, a surfactant can be added to decrease interfacial surface tension and to promote wetting of the phase change material 614, or a dispersant can be added to promote uniform dispersion or incorporation of a higher loading level of the phase change material 614. As another example, a thickener can be added to adjust a viscosity of the blend, or an anti-foam agent can be added to remove any trapped air bubbles that are formed during mixing. Once formed, the blend can be applied to or deposited on the surface 606 of the first layer 602 using any suitable coating or printing technique. Thus, for example, the blend can be applied using roll coating, such as direct gravure coating, reverse gravure coating, differential offset gravure coating, or reverse roll coating; screen coating; spray coating, such as air atomized spraying, airless atomized spraying, or electrostatic spraying; extrusion coating; or transfer coating. After the blend is applied to the surface 606, the blend can be cured, dried, cross-linked, reacted, or solidified to form the second layer 604.

EXAMPLES

The following examples describe specific features of some embodiments of the invention to illustrate and provide a description for those of ordinary skill in the art. The examples should not be construed as limiting the invention, as the examples merely provide specific methodology useful in understanding and practicing some embodiments of the invention.

Example 1

Five different labels for glass bottles were provided. Two of these labels, namely label A and label B, were formed so as to include microcapsules containing a phase change material. In particular, label A was formed with a coating that included about 50% by dry weight of the microcapsules, while label B was formed with a coating that included about 30% by dry weight of the microcapsules. The remaining three labels, namely label C, label D, and label E, lacked the microcapsules and served as control labels. In particular, label C was a plain, 360° wrap label, label D was a plain, pressure-sensitive label, and label E was a standard, non-360° wrap label. These labels were coupled to respective glass bottles, and the glass bottles were then filled with substantially equal amounts of water.

Figure 7:
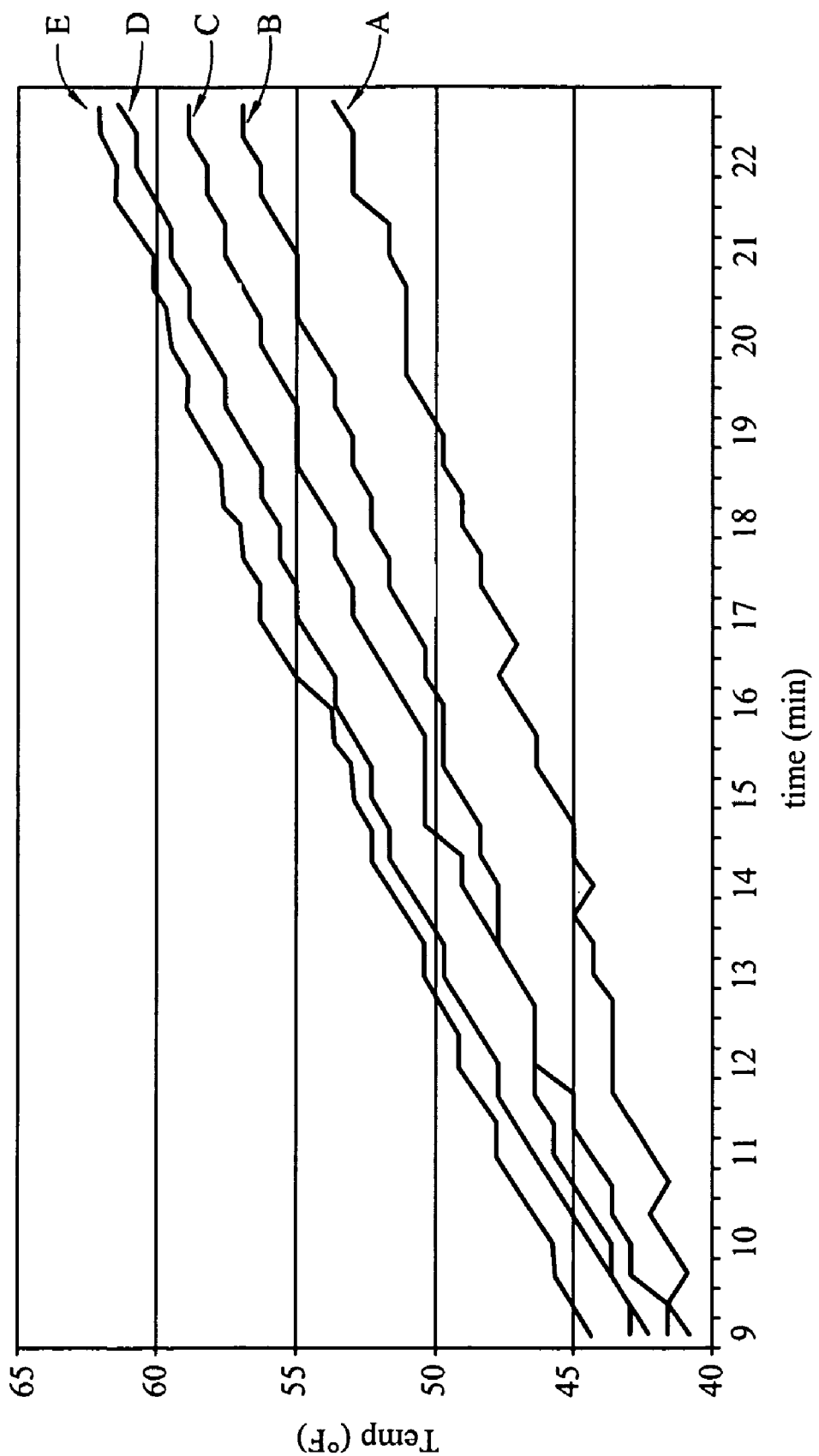
FIG. 7 illustrates results of temperature measurements for glass bottles that are coupled to different labels, according to an embodiment of the invention.

Temperature measurements of contents of the glass bottles were made in accordance with a test protocol, which involved intermittently holding the glass bottles to simulate conditions during use. In particular, the test protocol involved alternating a "hands-on" period of about 10 seconds and a "hands-off" period of about 20 seconds for a total duration of up to about 30 minutes. Referring to FIG. 7, results of the temperature measurements for the five different labels are shown as a function of time. As can be appreciated by referring to FIG. 7, the contents of the glass bottles coupled to label A and label B exhibited reduced warming as compared with the contents of the glass bottles coupled to the control labels.

Example 2

Two different beverage cans were provided. One of the beverage cans, namely beverage can F, was formed with a coating that included microcapsules containing a phase change material. The remaining beverage can, namely beverage can G, lacked the microcapsules and served as a control beverage can. The beverage cans were filled with substantially equal amounts of a liquid, and temperature measurements were made in accordance with a test protocol similar to that described in connection with Example 1.

Figure 8:
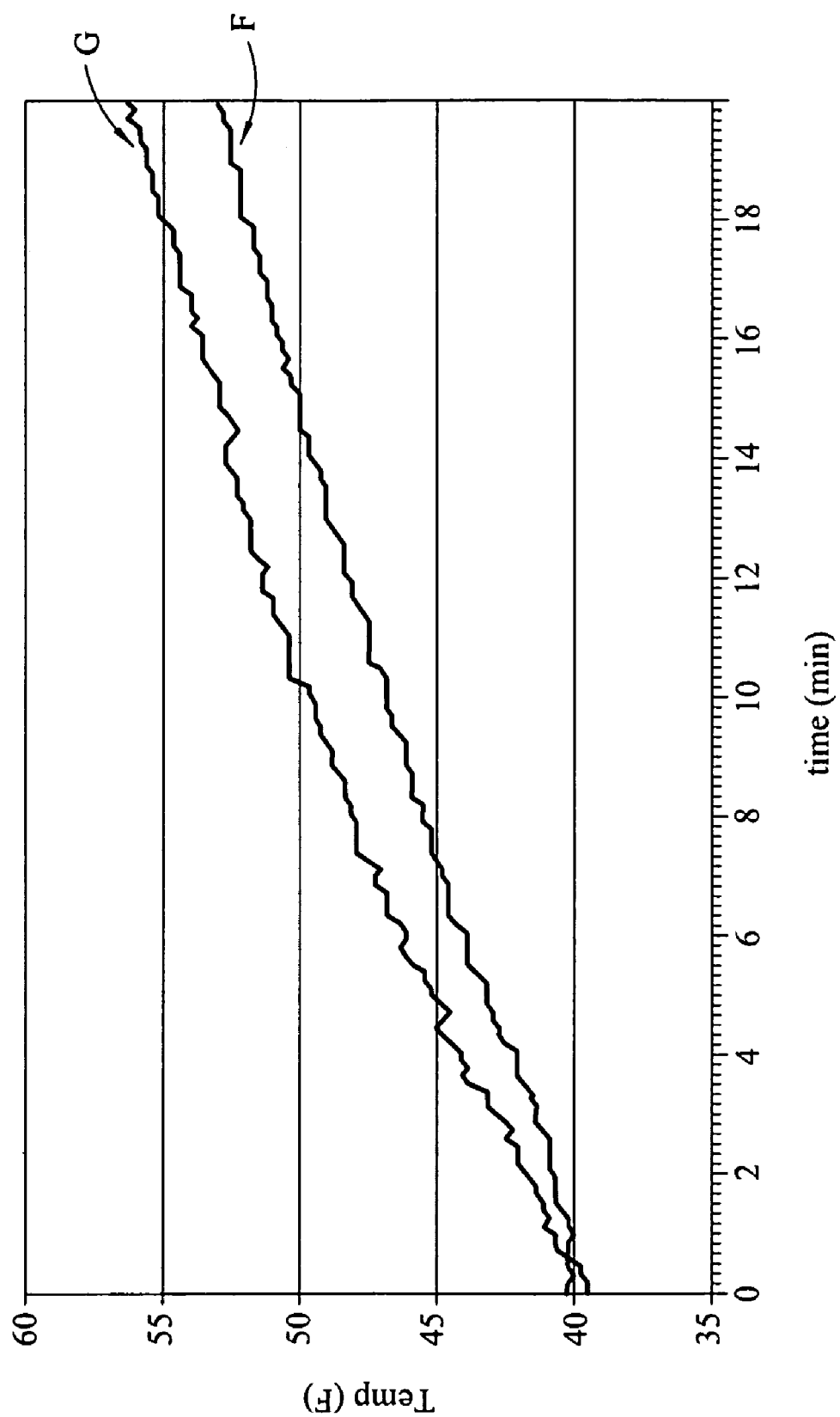
FIG. 8 illustrates results of temperature measurements for beverage cans, according to an embodiment of the invention.

Referring to FIG. 8, results of the temperature measurements for the beverage cans are shown as a function of time. As can be appreciated by referring to FIG. 8, contents of beverage can F exhibited reduced warming as compared with contents of the control beverage can.

It should be appreciated that the embodiments of the invention described above are provided by way of example, and various other embodiments are contemplated. For example, while some embodiments of the invention have been described with reference to bags, beverage bottles, beverage cans, and cups, it is contemplated that other types of food containers can be implemented in a similar fashion as described herein. Examples of other types of food containers include boxes, cartons, coffee pots, fast-food containers, jugs, microwaveable containers, plastic containers, tea pots, and thermos. It is also contemplated that other types of containers and packagings can be similarly implemented.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit and scope of the invention. All such modifications are intended to be within the scope of the claims appended hereto. In particular, while the methods disclosed herein may have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A food or beverage container, comprising:
   an upper wall;
   a lower wall; and
   a side wall extending between the upper wall and the lower wall,
   at least one of the upper wall and the lower wall including
   a phase change material distributed with a first concentration on the at least one of the upper wall and the lower wall, the side wall including a phase change material distributed with a second concentration on a portion of the side wall, the phase change material on the side wall having a latent heat of at least 40 J/g and a transition temperature in the range of 0° C. to 100° C., the phase change material on the side wall having a higher latent heat than the phase change material on the at least one of the upper wall or the lower wall, the phase change materials on both the side wall and the at least one of the upper or lower walls providing thermal regulation based on at least one of absorption and release of the latent heat at the transition temperature, wherein a portion of the side wall that includes phase change material corresponds to the portion of the food or beverage container that is typically in contact with a user during use of the container.

2. The container of claim 1, wherein the upper wall, the lower wall, and the side wall define an internal compartment to contain a food item, and the upper wall includes a tab member operable to define an opening to provide access to the food item.

3. The container of claim 1, wherein the side wall is substantially cylindrical.

4. The container of claim 1, wherein the side wall includes a coating formed of a plurality of microcapsules containing the phase change material.

5. The container of claim 4, wherein the side wall further includes a substrate formed of a metal, and the coating covers at least a portion of the substrate.

6. The container of claim 4, wherein the coating is further formed of a binder, and the plurality of microcapsules are dispersed in the binder.

7. The container of claim 6, wherein the coating includes from 10 percent to 40 percent by dry weight of the plurality of microcapsules containing the phase change material.

8. The container of claim 6, wherein the coating includes from 25 percent to 35 percent by dry weight of the plurality of microcapsules containing the phase change material.

9. The container of claim 1, wherein the latent heat of the phase change material on the side wall is at least 80 J/g.

10. The container of claim 2, wherein the food or beverage container contains a cold item, and the transition temperature of the phase change material is in the range of 0° C. to 32° C.

11. The container of claim 2, wherein the food or beverage container contains a hot food item, and the transition temperature of the phase change material is in the range of 32° C. to 66° C.

12. The container of claim 4, wherein the plurality of microcapsules have sizes in the range of 0.5 micron to 50 microns.

13. The container of claim 4, wherein the plurality of microcapsules have sizes in the range of 15 microns to 25 microns.

14. The container of claim 4, wherein the plurality of microcapsules are monodisperse with respect to their sizes.

* * * * *